Oct. 27, 1936.   W. SCHULTE   2,058,835
PROCESS FOR THE MANUFACTURE OF THREADS, STRINGS, BANDS, FILMS AND THE LIKE
Filed Aug. 3, 1934
FIG:1
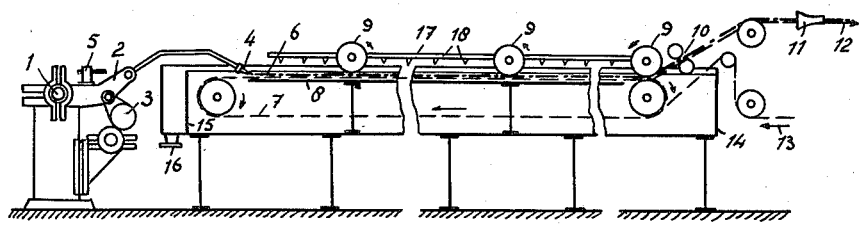
FIG:2
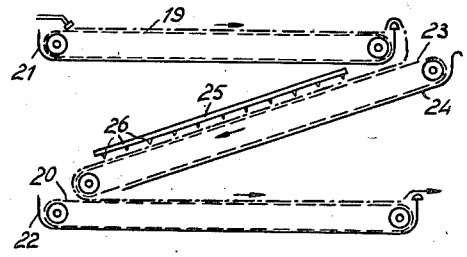
FIG:3
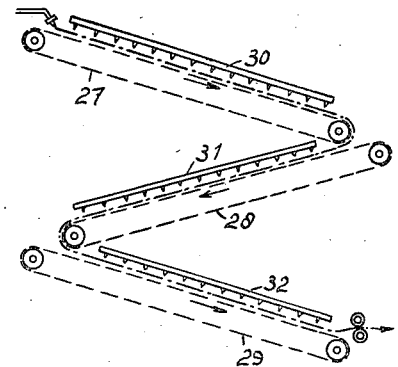
Inventor:
Wilhelm Schulte
By (signature)
Attorney Patented Oct. 27, 1936

2,058,835

UNITED STATES PATENT OFFICE 2,058,835

PROCESS FOR THE MANUFACTURE OF THREADS, STRINGS, BANDS, FILMS, AND THE LIKE

Wilhelm Schulte, Meppel, Netherlands, assignor to N. V. Koninklijke Pharmaceutische Fabrieken v/h Brocades-Stheeman & Pharmacia, Meppel, Netherlands, a limited-liability company of the Netherlands Application August 3, 1934, Serial No. 738,355
In the Netherlands May 24, 1934

6 Claims. (Cl. 18—57)

This invention relates to an improvement in or modification of the process described and claimed in my copending patent application, Serial No. 710,184, for the manufacture of threads, strings, bands, films and the like, such as surgical suture material, strings for violins, rackets and the like from elastin-containing and/or collagenous animal fibres or materials containing the same.

According to one embodiment described in my aforesaid patent application, the starting material, for example sinews, is allowed to swell in a swelling agent, for example a dilute solution of an organic or inorganic acid or acid-reacting compound, while maintaining the fibrous structure and without substantial damage of the fibres taking place, preferably until a mass, defined in my aforesaid patent application as being apparently homogeneous, is obtained, after which the swollen material is teased out. If desired the material is thereafter further homogenized. For this purpose the teased out material is, for example, pressed by centrifugal action through a narrow slit, the width of which is preferably equal to, or smaller than, the diameter of the nozzles through which the mass has subsequently to be pressed. The suspension is then conveyed to nozzles, for example with the aid of spinning pumps as employed in the artificial silk industry, and pressed into a bath, which is defined in my aforesaid patent application as a "shrinking bath". In this shrinking bath, which consists, for example, of a dilute aqueous solution of acid-fixing substances, the fibres again separate out, the shape of the resulting product being substantially determined by the shape of the nozzle through which the material is pressed. The resulting products are thereafter further worked up in substantially known manner.

According to this invention it has been found to be advantageous, instead of, or in addition to, passing the masses issuing from the nozzles through a shrinking bath, to spray the said masses with a liquid shrinking agent and/or to subject them to the action of a shrinking agent in the form of gas or vapour. The masses issuing from the nozzles may, of course, be subjected in any desired sequence to any two or all three of the aforesaid treatments with a shrinking agent.

In this way the concentration and/or the temperature of the shrinking agent can be more easily varied than when employing the process according to my aforesaid patent application, as a consequence of which the degree and rate of shrinking can be very satisfactorily regulated and the operation is under better control. Moreover, the employment of the process of this invention enables the entire shrinking apparatus to be disposed in a smaller space.

It has already been mentioned in my aforesaid patent application that it is advisable to press the suspension through the nozzles onto a supporting track or conveyor, which may, if desired, travel through the shrinking bath. For this purpose an endless belt is preferably employed, which may or may not be constructed in the form of a sieve and which can at the same time convey the fibrous mass, which has again separated out in the shrinking bath, through a number of devices connected with this bath. For an efficient action of the bath on the mass issuing from the nozzles the length of travel in the bath is dependent upon various conditions and must be adapted to these conditions or vice versa. This, however, gives rise to a certain rigidity of operation once a certain length of bath has been definitely selected. Too great a bath length may be avoided by superimposing several baths and passing the fibrous masses successively through these baths. It is difficult in this case, however, to utilize the vertical distance between two successive baths.

The present invention enables these or similar difficulties to be readily avoided or overcome.

If the operation is effected with a shrinking agent in the form of gas or vapour, this gas or vapour may be conveyed, in a manner known in the artificial silk industry, both in the same direction as, and in countercurrent to, the masses issuing from the nozzles. If the operation is not carried out vertically a supporting track or conveyor is preferably used for conveying the mass. An alternative procedure, however, is to employ the spinning funnels, customarily employed in the artificial silk industry for dry spinning, in which event, of course, the length of the funnels must be adapted to the nature of the process.

The shrinking agent in the form of gas or vapour, which may or may not be preheated, may be employed in a more or less concentrated condition, whereby its degree of action is to a certain extent under control. After the shrinking agent has left the shrinking chamber it may be regenerated and employed again.

If desired, several shrinking chambers may be employed successively, one mutual device being employed for circulating the shrinking agent through all the shrinking chambers or each chamber being provided with a separate circulating device.

If the mass issuing from the nozzles is sprayed with liquid shrinking agent, a track or conveyor will be necessary for supporting and conveying the mass, insofar as the latter has not yet acquired sufficient strength.

The supporting track or conveyor may be disposed in a horizontal plane or at an angle to the horizontal plane, both when employing a gaseous shrinking agent and when spraying with a liquid shrinking agent. The track or conveyor may consist of several horizontal parts, for example disposed one above the other, or of parts, some of which are disposed in a horizontal plane and others at an angle to the horizontal plane. The angle, at which the non-horizontally disposed tracks or conveyor or track or conveyor parts are set, may vary within wide limits.

The conveyors may consist of the known flexible transporting elements and also of perforated or non-perforated belts, chains and the like. The fibrous mass may, however, also be guided along stationary tracks, which merely serve as supporting members. The tracks or conveyors may be of various designs. As in the case of my aforesaid patent application they may be flat or, for example, in the form of channels, the latter being also applicable when the track or conveyor is disposed at an angle to the horizontal plane, in which event the track or conveyor simultaneously serves as a channel for the removal of the shrinking liquid sprayed on from the sides or from above.

Each thread can, of course, be guided along a separate track or conveyor or a number of threads can be guided along one single track or conveyor. If several conveyors are employed and these are set in motion, they may be operated at various speeds and in this way also withdrawal of the threads can be effected at different rates.

In the accompanying diagrammatic drawing three embodiments of apparatus, suitable for carrying the present invention into effect, are illustrated by way of example.

Fig. 1 shows an elevation partly in section of an apparatus, in which the material issuing from the nozzles is subjected to spraying with a shrinking liquid, if desired in combination with a treatment in a shrinking bath.

Fig. 2 shows a similar view of an apparatus combining a treatment in a shrinking bath and spraying with a shrinking liquid, and Fig. 3 shows a similar view of an apparatus in which the material is subjected only to spraying with a liquid shrinking agent.

Referring to Fig. 1, the spinning liquid introduced from the conduit 1 is conveyed by the spinning pump 3 mounted on the support 2 in definite quantities to the nozzle 4. 5 is a closing member. The thread 6, indicated in the drawing by a dot-and-dash line, issues from the nozzle 4 onto the upper part of the endless belt 7 (broken line) and is in this way conveyed by the latter towards the right. The conveyor belt 7 rests on a stationary support 8 (which may be replaced by resistance rollers). A feed pipe 17, provided with nozzles 18, with the aid of which the shrinking agent is sprayed on the threads, is disposed above the belt 7. The further steps of the process may be exactly the same as those described in my aforesaid patent application. During its travel the thread passes one or more vertically displaceable rollers 9, which more or less deform it and consequently enable the shrinking agent to react more rapidly up to the centre of the thread. After sufficient action of the shrinking agent, the thread, which has been rolled out into a kind of band or ribbon, passes between the pressure rollers 10, which remove the excess of shrinking liquid. The thread then passes through the device 11, in which it acquired a more compact form, by a folding action, tube formation or the like, after which it moves forward in the direction of the arrow 12. The conveyor belt at the conclusion returns empty in the direction of the arrow 13 and passes through the trough 14, which serves to collect the shrinking liquid. This liquid may be allowed to discharge through 16. If desired, a partition wall 15 may be provided in order to keep the liquid in the trough at a certain level, for example just above the threads.

Referring to Fig. 2, the beginning and end portions of the supporting track are disposed horizontally; at these portions of the track the endless belts travelling in the shrinking baths 21 and 22 convey the threads through the latter. In between, the track is disposed at an angle to the horizontal plane and consists of the endless belt 23. This latter belt travels in the trough 24, which serves as a discharge channel for the shrinking liquid, which is sprayed with the aid of the feed pipe 25 and nozzles 26 onto the thread disposed on the belt 23.

Owing to the fact that the track or conveyor consists of separate superimposed parts, a saving of space amounting to about 60% is effected.

Referring to Fig. 3, the supporting track comprises three endless belts 27, 28 and 29, disposed at an angle to the horizontal plane. The shrinking liquid is sprayed onto the threads from nozzles disposed on the feed pipes 30, 31 and 32.

In the figures only those parts are shown, which are necessary to give a clear idea of the invention. This applies particularly to Figs. 2 and 3. The phrase "shrinking agent in non-compact form", appearing in the appended claims, is intended to refer to a shrinking agent in the form of a gas, vapor or liquid spray, as distinguished from a liquid in the form of a bath or pool.

What I claim is:

1. A process for the manufacture of products from elastin-containing or collagenous animal fibrous materials, which comprises swelling said materials in a swelling agent while maintaining the fibrous structure and without substantial damage to the fibers, treating said swollen materials to form a suspension of elementary fibers of the materials, extruding said suspension of elementary fibers of the starting materials to produce products of desired form, and subjecting the products to the action of a shrinking agent in non-compact form.

2. A process for the manufacture of products from elastin-containing or collagenous animal fibrous materials, which comprises swelling said materials in a swelling agent while maintaining the fibrous structure and without substantial damage to the fibers, treating said swollen materials to form a suspension of elementary fibers of the materials, extruding said suspension of elementary fibers of the starting materials to form products of desired form, and subjecting the products to the action of a shrinking agent in the form of a liquid spray.

3. A process for the manufacture of products from elastin-containing or collagenous animal fibrous materials, which comprises swelling said materials in a swelling agent while maintaining the fibrous structure and without substantial damage to the fibers, treating said swollen materials to form a suspension of elementary fibers of the materials, extruding said suspension of elementary fibers of the starting materials to produce products of desired form, and subjecting the products to the action of a shrinking agent in the gaseous phase.

4. A process for the manufacture of products from sinews, which comprises swelling said sinews in a swelling agent while maintaining the fibrous structure and without substantial damage to the fibers, treating said swollen sinews to form a suspension of elementary fibers of the sinews, extruding said suspension of elementary fibers of the starting materials to produce products of desired form, and subjecting the products to the action of a shrinking agent in non-compact form.

5. A process for the manufacture of products from sinews, which comprises swelling said sinews in a swelling agent while maintaining the fibrous structure and without substantial damage to the fibers, treating said swollen sinews to form a suspension of the elementary fibers of the sinews, extruding the suspension of elementary fibers of the starting materials through an orifice to produce products of desired form, conveying the products away from the orifice, and subjecting the products while being conveyed to the action of a shrinking agent in non-compact form.

6. A process for the manufacture of surgical suture material from elastin-containing or collagenous animal sinews, comprising swelling said sinews in a dilute solution of an acid-reacting compound while maintaining the fibrous structure and without substantial damage to the fibers, teasing out said swollen sinews to form a suspension of elementary fibers, extruding the suspension to produce products of desired form, and subjecting the products to the action of a dilute solution of an acid-fixing substance in non-compact form.

WILHELM SCHULTE.